(12) United States Patent
Pellowski et al.

(10) Patent No.: US 9,021,117 B1
(45) Date of Patent: Apr. 28, 2015

(54) DYNAMICALLY SELECTABLE TRANSPORT FOR KERNEL DRIVER MANAGEMENT

(75) Inventors: Robert J. Pellowski, Ledyard, CT (US); Eric I. West, Brighton, MA (US); Hitesh P. Trivedi, Cambridge, MA (US)

(73) Assignee: EMC Corporation, Hopkinton, MA (US)

( * ) Notice: Subject to any disclaimer, the term of this patent is extended or adjusted under 35 U.S.C. 154(b) by 331 days.

(21) Appl. No.: 13/537,868

(22) Filed: Jun. 29, 2012

(51) Int. Cl.
 *G06F 15/16* (2006.01)
 *H04L 29/08* (2006.01)
 *H04L 29/06* (2006.01)

(52) U.S. Cl.
 CPC .............. *H04L 67/2823* (2013.01); *H04L 69/08* (2013.01)

(58) Field of Classification Search
 CPC . H04L 41/08; H04L 41/0853; H04L 67/2823; H04L 69/18
 USPC .......... 709/220, 223, 238, 203, 230; 719/328, 719/317; 710/305; 717/136
 See application file for complete search history.

(56) References Cited

U.S. PATENT DOCUMENTS

| 7,908,594 | B2* | 3/2011 | Varanasi et al. | 717/136 |
| 8,312,475 | B2* | 11/2012 | Sareen et al. | 719/317 |
| 8,447,782 | B1 | 5/2013 | Vipul et al. | |
| 8,452,901 | B1 | 5/2013 | Sandstrom et al. | |
| 2003/0065864 | A1* | 4/2003 | Hollinger | 710/305 |
| 2005/0027841 | A1* | 2/2005 | Rolfe | 709/223 |
| 2007/0011348 | A1* | 1/2007 | Bansal et al. | 709/238 |
| 2008/0216097 | A1* | 9/2008 | Quinn et al. | 719/328 |
| 2009/0089816 | A1* | 4/2009 | Kim et al. | 719/328 |
| 2012/0296959 | A1* | 11/2012 | Momchilov et al. | 709/203 |

OTHER PUBLICATIONS

Helen S. Raizen, et al., Management of Path Operating Mode Transitions in Multipathing Host Computer, U.S. Appl. No. 13/535,752, filed Jun. 28, 2012.
Robert J. Pellowski, et al., "Efficient Management of Kernel Driver Performance Data", U.S. Appl. No. 13/535,862, filed Jun. 28, 2012.

\* cited by examiner

*Primary Examiner* — Jungwon Chang
(74) *Attorney, Agent, or Firm* — BainwoodHuang

(57) ABSTRACT

A method is disclosed for processing a kernel driver control command at a client machine. The method includes (a) receiving the kernel driver control command at the client machine via a user interface, (b) selecting a target server from a set of servers based on the kernel driver control command, (c) selecting a protocol path to use to reach the target server based on the availability of the target server via a set of possible protocol paths, (d) reformatting the kernel driver control command into a protocol format associated with the selected protocol path, and (e) sending the reformatted kernel driver control command to the target server via the selected protocol path for execution by a kernel driver running on the target server. A corresponding apparatus and computer program product for performing the method are also provided.

19 Claims, 3 Drawing Sheets

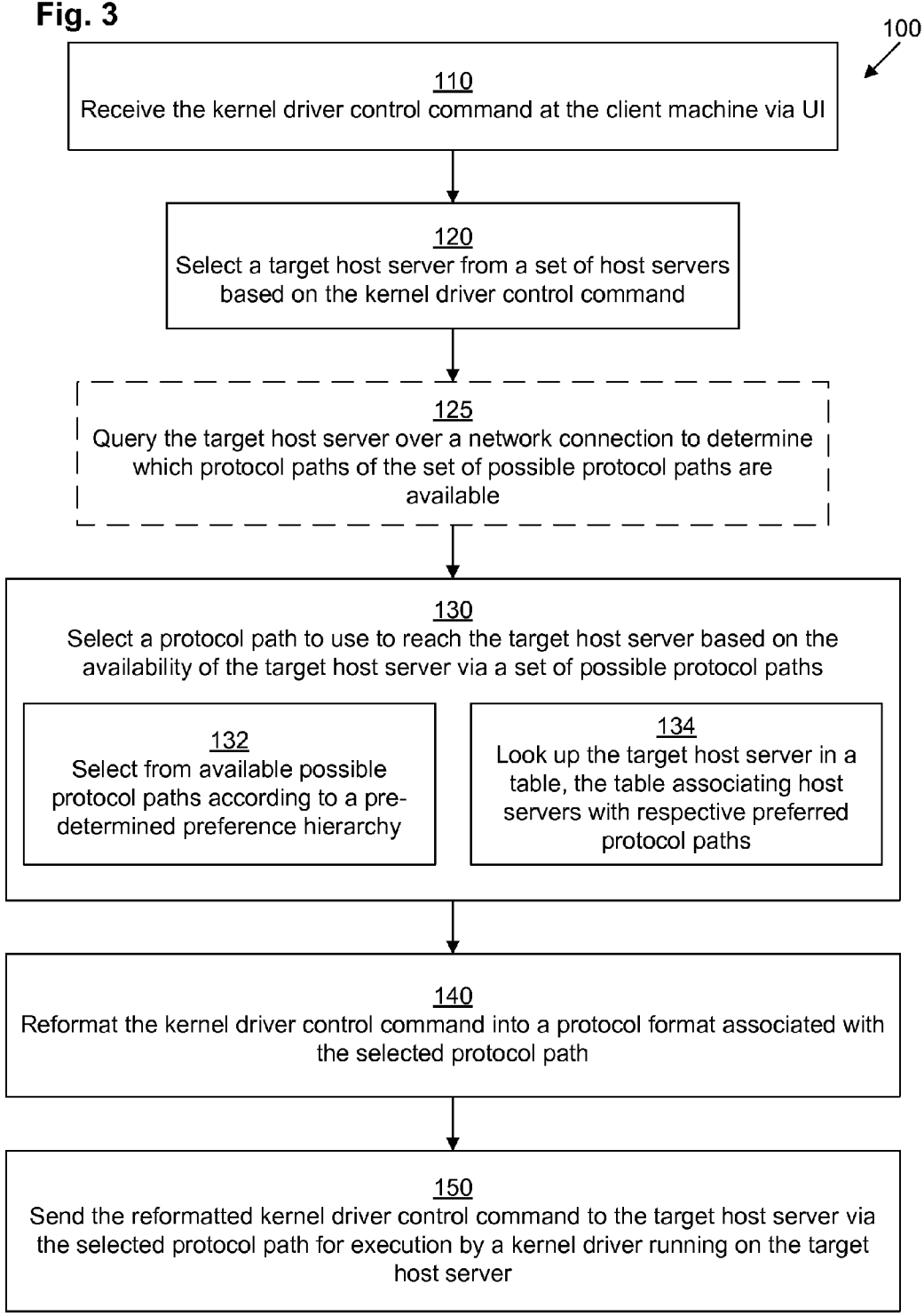

DYNAMICALLY SELECTABLE TRANSPORT FOR KERNEL DRIVER MANAGEMENT

BACKGROUND

Kernel drivers are often used to control various low-level functions of a computer. In some cases, these kernel drivers have an interface to allow management by a user. Some of theses driver user interfaces are command line interfaces (CLIs), which allow a user to enter a text-based command to be performed by the kernel driver. The CLI typically executes on the same machine as the kernel driver itself.

Some CLIs are designed to operate on a machine remote from a separate host running a particular kernel driver. Thus, when a user enters in a command, the CLI forwards the command across a network to the remote host for execution by the kernel driver.

SUMMARY

Although the above-described remote CLIs are useful, they are limited by the fact that the CLI must be pre-configured to access any given remote kernel driver at compile-time, since each kernel driver may have different requirements. Thus, it would be desirable to avoid this compile-time configuration requirement.

Embodiments disclosed herein are directed to techniques for a client to dynamically communicate with various remote kernel drivers according to a run-time selectable protocol. Thus, a single client can communicate with many remote host servers according to a proper protocol for each individual host server's requirements.

In one embodiment, a method is disclosed for processing a kernel driver control command at a client machine. The method includes (a) receiving the kernel driver control command at the client machine via a user interface, (b) selecting a target host from a set of host servers based on the kernel driver control command, (c) selecting a protocol path to use to reach the target host based on the availability of the target host via a set of possible protocol paths, (d) reformatting the kernel driver control command into a protocol format associated with the selected protocol path, and (e) sending the reformatted kernel driver control command to the target host via the selected protocol path for execution by a kernel driver running on the target host. A corresponding apparatus and computer program product for performing the method are also provided.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 illustrates an example method according to various embodiments.

DETAILED DESCRIPTION

Embodiments disclosed herein are directed to techniques for a client to dynamically communicate with various remote kernel drivers according to a run-time selectable protocol. Thus, a single client can communicate with many remote host servers according to a proper protocol for each individual host server's requirements.

Figure 1:
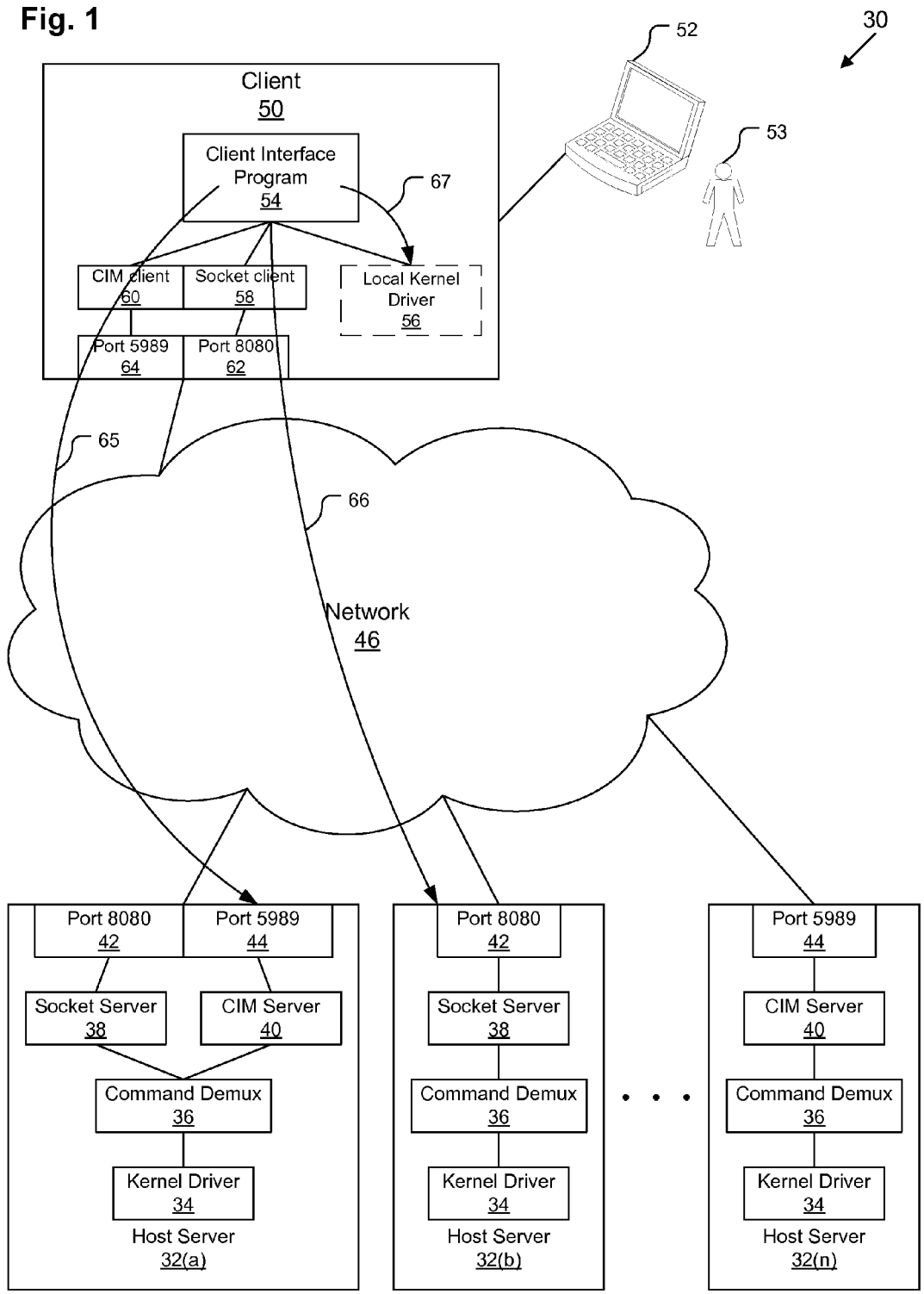
FIG. 1 illustrates an example system for use in conjunction with various embodiments.

FIG. 1 depicts an example system 30. System 30 includes one or more host servers 32 (depicted as host servers 32(a), 32(b), . . . , 32(n)). Host servers 32 may be any kind of computer capable of running a kernel driver 34, such as, for example, a personal computer, a desktop computer, a laptop computer, a workstation computer, a server computer, an enterprise system, or a data storage system. In one embodiment, a host server 32 may be a data storage host computer configured to send data storage commands to a data storage system. One example of a kernel driver 34 is a multipathing data storage driver, such as the PowerPath driver produced by the EMC Corp. of Hopkinton, Mass.

Some of the host servers, such as host server 32(a), operate both a socket server 38 and a Common Information Model (CIM) server 40 for remote communication with a user over a respective transport protocol. Socket server 38 operates over a particular port 42, e.g., port 8080, while CIM server 40 operates over a different particular port 44, e.g., port 5989. It should be understood that the socket and CIM protocols are mentioned by way of example only. In other embodiments, clients 58, 60, ports 42, 44, 62, 64, and transport protocol servers 38, 40 may operate according to any known transport protocol, such as, for example, the Hypertext Transfer Protocol (HTTP) (port 80), the Hypertext Transfer Protocol Secure (HTTPS) (port 443), or the File Transfer Protocol (FTP) (ports 20 and 21).

Command demultiplexer (demux) 36 also operates on host server 32(a) to convert user commands into a format understandable by the kernel driver 34 for execution.

Some of the host servers 32 may only include one or the other of these transport protocol servers 38, 40, or another server for remote communication with a user over a different transport protocol. For example, as depicted, host server 32(b) only includes a socket server 38 and not a CIM server 40, while host server 32(n) only includes a CIM server 40 and not a socket server 38.

Each host server 32 connects to a network 46 to allow for communication with a remote client 50. Network 46 may be any kind of remote connection or network, such as, for example, a local area network, a wide area network, a storage area network, a point-to-point connection, or a fabric of connections and switches.

Client 50 may be any kind of computing device, such as, for example, a personal computer, a desktop computer, a laptop computer, a workstation computer, a server computer, an enterprise system, a data storage system, a mobile device, a smart phone, or a tablet computer. Client 50 connects to one or more user interface (UI) devices 52 which allow a user 53 to enter commands into and receive feedback from the client 50. Client 50 runs a client interface program (CIP) 54 which implements a command line interface (CLI) for communicating with the user 53 over the UI devices 52. Client 50 also runs a socket client 58 and a CIM client 60, which are configured to communicate with respective remote socket server 38 and CIM servers 40 over respective particular local ports 62, 64. In some embodiments, client 50 may also function as a host server 32, running a local kernel driver 56. CIP 54 also serves to dynamically route user commands over an appropriate path 65, 66, 67 towards a kernel driver 34, 56, as described in further detail below.

Figure 2:
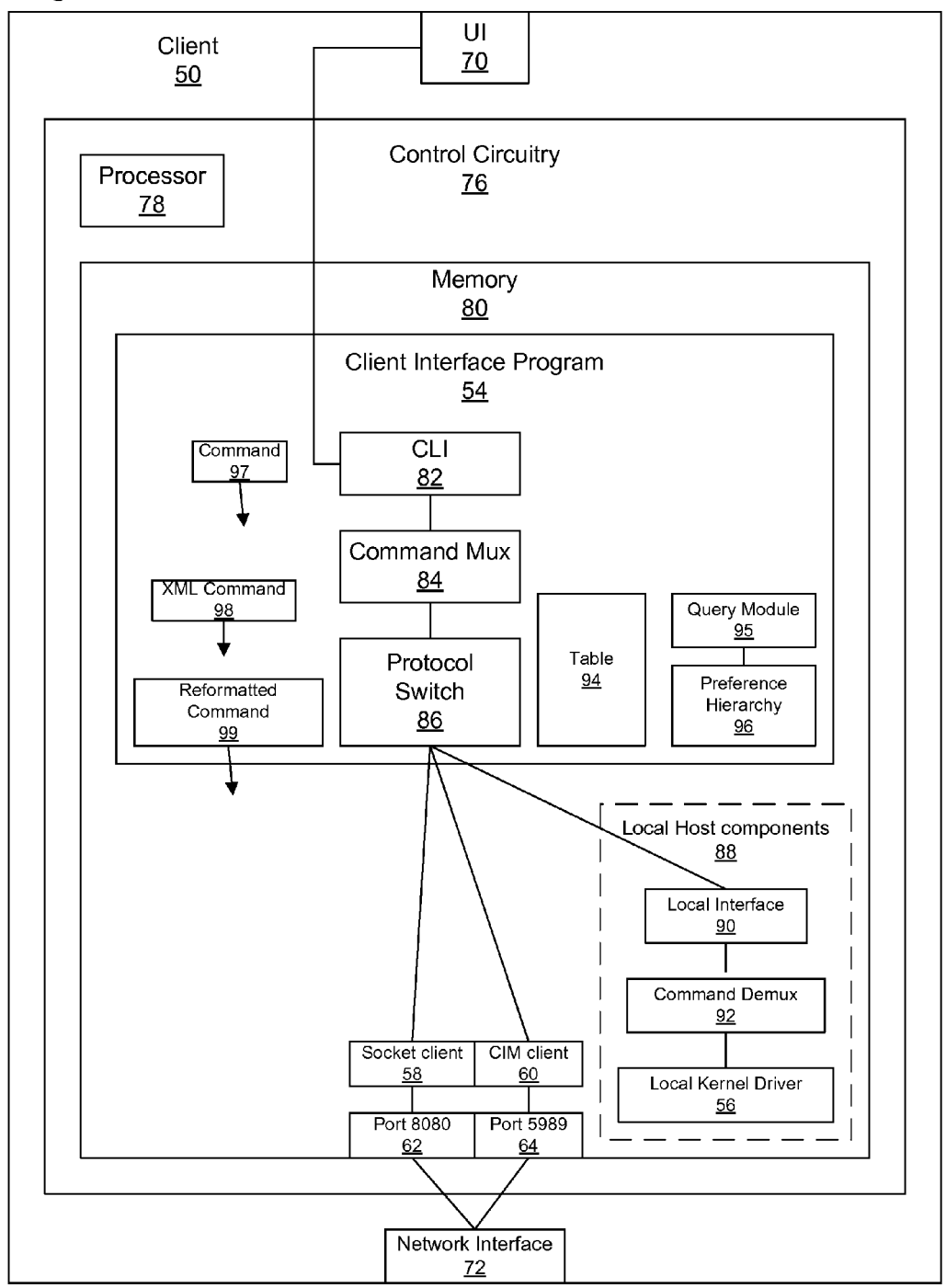
FIG. 2 illustrates an example apparatus according to various embodiments.

FIG. 2 depicts an example client 50 in further detail. Client 50 includes a UI 70 for communicating with UI devices 52. UI 70 may include, for example, one or more of a keyboard adapter, a mouse adapter, a serial port, a graphics card, etc., while UI devices 52 may include one or more of a keyboard, a mouse, a monitor, a printer, etc. Client 50 also includes a network interface 72 (e.g., an Ethernet card) for connecting to network 46, as well as control circuitry 76. Control circuitry 76 includes a processor 78 and memory 80. Processor 78 may be any kind of processing device for performing operations, such as, for example, a central processing unit, a microprocessor, a collection of multiple microprocessors, a digital signal processor, a field-programmable gate array, a collection of circuits configured to perform various operations, a storage processor, or another similar device or set of devices configured to perform operations.

Memory 80 may include, for example, system memory, cache memory, volatile memory, random access memory, non-volatile memory, flash memory, data storage devices, some combination thereof, or another similar device or set of devices configured to store running software and or data. Memory 80 stores executing and loaded code as well as associated data during execution, including an operating system (not depicted), various drivers and applications, transport protocol clients 58, 60, ports 62, 64, local hosting components 88, and CIP 54, which, when executed, performs a method as described below in connection with FIG. 3.

CIP 54 includes a CLI 82 for interacting with the user 53, a command multiplexer (mux) 84 for converting user commands into a device-independent format, and a protocol switch 86 for dynamically routing commands over the appropriate path 65, 66, 67 and formatting the commands appropriately for a chosen protocol. In connection with protocol switch 86, CIP 54 may also store a table 94, a query module 95, and a preference hierarchy 96. Various commands 97-99 may also be temporarily stored in CIP 54 during execution.

Local hosting components 88 include a local interface 90, a command demux 92, and local kernel driver 56.

Having described the various systems, apparatuses, and associated constructs of and used in conjunction with various embodiments, this Description will now turn to describing various method embodiments which may be performed in conjunction with the above-described systems, apparatuses, and associated constructs.

FIG. 3 illustrates an example method 100 performed by client 50. Method 100 is performed by processor 78 as it executes CIP 54, however, as shorthand, this execution will henceforth be described as being performed by CIP 54 or one of its component modules 82, 84, 86, 95.

In step 110, CLI 82 receives a kernel driver control command 97 from the user 53 via the UI 70. For example, the user 53 may have typed in "powermt version host=HostA.emc.com" which indicates that a version command should be sent to HostA.emc.com. It should be understood that in some embodiments, instead of receiving the kernel driver control command 97 from the user 53 via the UI 70, kernel driver control command 97 may be received from another application via a programmatic interface. In some embodiments, at this stage, command mux 84 converts command 97 into a device-independent format, such as XML command 98, which may be an Extensible Markup Language (XML) construct having various data structures therein. XML is a markup language defined by the XML 1.0 Specification promulgated by the World Wide Web Consortium. It should be understood that although the device-independent format is described as using XML, this is by way of example only. Other formats may be used as well, such as, for example, JavaScript Object Notation (JSON), which is described in RFC 4627 promulgated by the Internet Engineering Taskforce of Fremont, Calif.

In step 120, protocol switch 86 selects a target host server from a set of host servers 32 based on the kernel driver control command. Thus, in the above example, protocol switch 86 would select host server 32(a) based on the "host=HostA.emc.com" parameter of the command. In some embodiments, if no host parameter is entered, protocol switch 86 automatically selects the client 50 itself as the target host server.

In step 125, which may be omitted in certain embodiments, query module 95 queries the target host server (e.g., host server 32(a)) over network 46 to determine which protocol paths 65, 66, 67 of the set of possible protocol paths are available to communicate with that target host server. This may be accomplished by sending protocol query messages to a set of particular network ports (e.g., both to port 8080 and to port 5989, as well as to any other port on which another compatible transport protocol server operates according to well-established standards) of the target host server, the set of particular network ports each corresponding to a respective possible protocol path (e.g., port 8080 corresponds to socket path 66 and port 5989 corresponds to CIM path 66), and receiving a set of response messages from the target host server, the set of response messages indicating which possible protocol paths of the set of possible protocol paths are available. For example, in one embodiment, if no response is received to a particular protocol query message within a predetermined amount of time, it can be assumed that the path associated with the port that it was sent to is not available. In another embodiment, if a response is received which is not compatible with the appropriate protocol, then it can also be assumed that the path associated with the port that it was sent to is not available.

In step 130, the protocol switch 86 selects a particular protocol path to use to reach the target host server based on the availability of the target host server via a set of possible protocol paths 65, 66, 67. In some embodiments, in sub-step 132, protocol switch 86 selects from the available paths identified by the query module 95 according to a preference hierarchy 96. Preference hierarchy 96 may, for example, indicate that a CIM path 65, if available, is preferable to a socket path 66, while a local path 67 may have an even higher priority. In some embodiments, once the protocol switch 86 makes this determination based on the preference hierarchy 96, the target host server is thenceforth associated with the chosen path by storing an association in table 95. In some embodiments, step 130 is performed by the protocol switch 86 executing sub-step 134, in which the protocol switch 86 looks up the target host server in table 94 to find an associated path. In some embodiments, the protocol switch 86 first performs sub-step 134, and, if no association is found in table 84, the protocol switch 86 directs query module 95 to perform step 125 and then the protocol switch 86 goes on to perform sub-step 132.

In other embodiments, the protocol switch 86 selects the particular protocol path to use to reach the target host server by comparing response latencies from the queries sent in step 125 and choosing the particular protocol path that has the shortest latency.

In step 140, the protocol switch 86 reformats the XML (or JSON, etc.) command 98 (or, in some embodiments, the raw user command 97) into a protocol format associated with the selected protocol path, thus forming reformatted command 99. In some embodiments, protocol switch 86 accomplishes this step by adding transport-protocol-specific headers and/or footers to the XML command 98, performing a transport-protocol-specific type of compression to create a smaller binary version of the XML command 98, and then converting the compressed binary version back into a transport-protocolcompatible text format for clean transport (e.g., using base64 encoding), thereby forming reformatted command 99.

Finally, in step 150, protocol switch 86 sends the reformatted kernel driver control command 99 to the target host server via the selected protocol path for execution by a kernel driver 34, 56 running on the target host server. This is done by selectively sending the reformatted kernel driver control command 99 to the socket client 58, the CIM client 60, or the local interface 90, as appropriate for forwarding to the appropriate kernel driver 34, 56.

Thus, various techniques have been provided for a client to dynamically communicate with various remote kernel drivers according to a run-time selectable protocol. Thus, a single client can communicate with many remote host servers according to a proper protocol for each individual host server's requirements.

While various embodiments of the present disclosure have been particularly shown and described, it will be understood by those skilled in the art that various changes in form and details may be made therein without departing from the spirit and scope of the present disclosure as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method for processing a kernel driver control command at a client machine, the method comprising:
    receiving the kernel driver control command at the client machine via a user interface;
    selecting a target server from a set of servers based on the kernel driver control command;
    selecting a protocol path to use to reach the target server based on the availability of the target server via a set of possible protocol paths;
    reformatting the kernel driver control command into a protocol format associated with the selected protocol path; and
    sending the reformatted kernel driver control command to the target server via the selected protocol path for execution by a kernel driver running on the target server;
    wherein the method further comprises, in response to selecting the target server from the set of servers based on the kernel driver control command, querying the target server over a network connection to determine which protocol paths of the set of possible protocol paths are available.

2. The method of claim 1 wherein receiving the kernel driver control command at the client machine via the user interface includes receiving a text-based command via a command-line interface.

3. The method of claim 1 wherein receiving the kernel driver control command at the client machine via the user interface includes receiving a text-based command via a programmatic interface.

4. The method of claim 1 wherein the set of possible protocol paths includes a local path, a socket-based path, and a Common Information Model (CIM)-based path, the local path being usable to reach the target server when the target server is the client machine itself, and the socket-based path and CIM-based path being usable to reach the target server when the target server is remote from the client machine.

5. The method of claim 4 wherein selecting the protocol path includes selecting the local path if and only if the kernel driver control command fails to explicitly specify a target server.

6. The method of claim 4 wherein querying the target server over the network connection includes:
    sending query messages to a set of particular network ports of the target server, the set of particular network ports each corresponding to a respective possible protocol path; and
    receiving a set of response messages from the target server, the set of response messages indicating which possible protocol paths of the set of possible protocol paths are available.

7. The method of claim 6 wherein:
    receiving the set of response messages from the target server includes recording a response latency to each query message associated with its respective corresponding possible protocol path; and
    selecting the protocol path to use to reach the target server based on the availability of the target server via the set of possible protocol paths includes selecting the possible protocol path having a lowest associated response latency.

8. The method of claim 4 wherein selecting the protocol path to use to reach the target server based on the availability of the target server via the set of possible protocol paths includes selecting from available possible protocol paths according to a pre-determined preference hierarchy.

9. The method of claim 8 wherein the pre-determined preference hierarchy includes a preference for the CIM-based path over the socket-based path.

10. The method of claim 4 wherein selecting the protocol path to use to reach the target server based on the availability of the target server via the set of possible protocol paths includes looking up the target server in a table, the table associating servers with respective preferred protocol paths.

11. A method for processing a kernel driver control command at a client machine, the method comprising:
    receiving the kernel driver control command at the client machine via a user interface;
    selecting a target server from a set of servers based on the kernel driver control command;
    selecting a protocol path to use to reach the target server based on the availability of the target server via a set of possible protocol paths;
    reformatting the kernel driver control command into a protocol format associated with the selected protocol path; and sending the reformatted kernel driver control command to the target server via the selected protocol path for execution by a kernel driver running on the target server; wherein reformatting the kernel driver control command into the protocol format associated with the selected protocol path includes:
adding a protocol-specific set of headers to the kernel driver control command;
compressing the kernel driver control command according to a protocol-specific compression algorithm; and
converting the compressed kernel driver control command into a protocol-compatible text format.

12. The method of claim 1 wherein the target server is a data storage host, the data storage host being configured to control an attached data storage array, and the kernel driver is a multipathing data storage driver running on the target server.

13. An apparatus comprising:
a user interface;
a network connection; and
control circuitry configured to cause the apparatus to:
  receive a kernel driver control command via the user interface;
  select a target server from a set of servers based on the kernel driver control command;
  select a protocol path to use to reach the target server based on the availability of the target server via a set of possible protocol paths;
  reformat the kernel driver control command into a protocol format associated with the selected protocol path;
  send the reformatted kernel driver control command to the target server via the selected protocol path for execution by a kernel driver running on the target server; and
  in response to selecting the target server from the set of servers based on the kernel driver control command, query the target server over the network connection to determine which protocol paths of the set of possible protocol paths are available.

14. A computer program product comprising a tangible non-transitory computer-readable storage medium, the tangible non-transitory computer-readable storage medium storing instructions, which, when executed by a computer, cause the computer to perform the following operations:
  receiving a kernel driver control command via a user interface;
  selecting a target server from a set of servers based on the kernel driver control command;
  selecting a protocol path to use to reach the target server based on the availability of the target server via a set of possible protocol paths;
  reformatting the kernel driver control command into a protocol format associated with the selected protocol path;
  sending the reformatted kernel driver control command to the target server via the selected protocol path for execution by a kernel driver running on the target server; and
  in response to selecting the target server from the set of servers based on the kernel driver control command, querying the target server over a network connection to determine which protocol paths of the set of possible protocol paths are available.

15. The computer program product of claim 14 wherein the set of possible protocol paths includes a local path, a socket-based path, and a Common Information Model (CIM)-based path, the local path being usable to reach the target server when the target server is the computer itself, and the socket-based path and CIM-based path being usable to reach the target server when the target server is remote from the computer.

16. The computer program product of claim 15 wherein the instructions, when executed by the computer, further cause the computer to, when querying the target server over the network connection, perform the operations of:
  sending query messages to a set of particular network ports of the target server, the set of particular network ports each corresponding to a respective possible protocol path; and
  receiving a set of response messages from the target server, the set of response messages indicating which possible protocol paths of the set of possible protocol paths are available.

17. The computer program product of claim 16 wherein the instructions, when executed by the computer, further cause the computer to perform the operations of:
  when receiving the set of response messages from the target server, recording a response latency to each query message associated with its respective corresponding possible protocol path; and
  when selecting the protocol path to use to reach the target server based on the availability of the target server via the set of possible protocol paths, selecting the possible protocol path having a lowest associated response latency.

18. The computer program product of claim 15 wherein the instructions, when executed by the computer, further cause the computer to, when selecting the protocol path to use to reach the target server based on the availability of the target server via the set of possible protocol paths, perform the operation of selecting from available possible protocol paths according to a pre-determined preference hierarchy.

19. A method for processing a kernel driver control command at a client machine, the method comprising:
  receiving the kernel driver control command at the client machine via a user interface;
  selecting a target server from a set of servers based on the kernel driver control command;
  selecting a protocol path to use to reach the target server based on the availability of the target server via a set of possible protocol paths;
  reformatting the kernel driver control command into a protocol format associated with the selected protocol path; and
  sending the reformatted kernel driver control command to the target server via the selected protocol path for execution by a kernel driver running on the target server;
  wherein the method further comprises, in response to selecting the target server from the set of servers based on the kernel driver control command:
    sending query messages to a set of particular network ports of the target server, the set of particular network ports each corresponding to a respective possible protocol path; and
    receiving a set of response messages from the target server, the set of response messages indicating which possible protocol paths of the set of possible protocol paths are available.

* * * * *